United States Patent
Sargeant

(10) Patent No.: US 11,286,180 B2
(45) Date of Patent: Mar. 29, 2022

(54) WATER SOFTENER APPARATUS

(71) Applicant: Harvey Water Softeners Limited, Surrey (GB)

(72) Inventor: William Robert Sargeant, Surrey (GB)

(73) Assignee: Harvey Water Softeners Limited, Surrey (GB)

( * ) Notice: Subject to any disclaimer, the term of this patent is extended or adjusted under 35 U.S.C. 154(b) by 67 days.

(21) Appl. No.: 16/408,049

(22) Filed: May 9, 2019

(65) Prior Publication Data
US 2019/0345043 A1 Nov. 14, 2019

(30) Foreign Application Priority Data
May 10, 2018 (GB) ..................................... 1807582

(51) Int. Cl.
*C02F 1/42* (2006.01)
*B01D 15/18* (2006.01)
(Continued)

(52) U.S. Cl.
CPC ............ *C02F 1/42* (2013.01); *B01D 15/1885* (2013.01); *B01D 15/203* (2013.01); *B01D 15/361* (2013.01); *C02F 2209/40* (2013.01)

(58) Field of Classification Search
CPC .......... C02F 1/42; C02F 2209/40; C02F 1/00; C02F 5/00; C02F 2001/425; C02F 2303/16; B01D 15/1885; B01D 15/203; B01D 15/361; B01D 15/18; B01D 15/20; B01D 15/36; B01J 47/14; B01J 49/00; B01J 47/022; B01J 49/06; B01J 49/53; B01J 49/75; B01J 49/85; F16K 11/00; G01F 1/00
(Continued)

(56) References Cited

U.S. PATENT DOCUMENTS 3,396,845 A * 8/1968 Bouskill ................. B01D 35/12
210/98
3,891,552 A 6/1975 Prior et al.
(Continued)

FOREIGN PATENT DOCUMENTS

CN 200955032 10/2007
GB 2362114 A * 11/2001 ................ C02F 1/42
GB 2362114 1/2004

*Primary Examiner* — Akash K Varma
(74) *Attorney, Agent, or Firm* — GableGotwals

(57) ABSTRACT

A water softener apparatus comprises two water softener tanks one of which is always operating, valves controlling the flow of water and a flow-meter, wherein, after a set volume of water has passed through one tank, water is passed through the other tank. The apparatus uses ion-exchange tanks which may be regenerated by brine when not softening hard water. The flow-meter preferably comprises an actuator which moves in a cyclic movement in response to the flow of a set quantity of water and actuates two service valves which send pressured water signals to a drain shuttle valve. The drain shuttle valve then diverts hard water from one tank to another and initiates regeneration of the first tank. A regeneration meter terminates the alternate regeneration of the two tanks. The regeneration meter is positioned in the apparatus of a point where brine for regeneration of the two water softener components is received into the apparatus.

9 Claims, 5 Drawing Sheets

(51) Int. Cl.
*B01D 15/20* (2006.01)
*B01D 15/36* (2006.01)

(58) Field of Classification Search
USPC .......................................................... 210/98
See application file for complete search history.

(56) References Cited

U.S. PATENT DOCUMENTS

| | | | |
|---|---|---|---|
| 4,539,106 A * | 9/1985 | Schwartz | C02F 1/42 |
| | | | 210/143 |
| 5,273,070 A | 12/1993 | Chili et al. | |
| 5,310,488 A * | 5/1994 | Hansen | B01J 49/00 |
| | | | 210/674 |
| 5,681,454 A | 10/1997 | Schenk | |
| 2002/0195403 A1 | 12/2002 | Takeda et al. | |
| 2011/0284434 A1 * | 11/2011 | Hansen | C02F 1/00 |
| | | | 210/90 |

* cited by examiner

WATER SOFTENER APPARATUS

CROSS-REFERENCE TO RELATED APPLICATIONS

This United States application claims priority to British Patent Application No. GB 1807582.0 filed 10 May 2018 which is incorporated herein by reference.

FIELD OF THE INVENTION

The invention relates to a water softener apparatus comprising a water softener component which has to be rendered inoperable to soften water at intervals, for example, so that the component can be regenerated.

BACKGROUND OF THE INVENTION

More particularly, but not exclusively, the invention relates to a water softener comprising an active resin water softening component that has to be regenerated occasionally by passing brine through it. Whilst the component is being regenerated it is inoperable to supply softened water. In known domestic water softeners, this problem is ameliorated by arranging for regeneration to take place at a time of likely low demand, for example during the very early morning. Also known are water softeners comprising two softening components which are regenerated during respective different time intervals so that at least one of them is operable all the time, for example as disclosed in U.S. Pat. No. 5,273,070. The apparatus according to this patent comprises an electrically motorised valve arrangement controlled by a microprocessor which is programmed to sequence the operations of the valve arrangement. However, this requires an electrical supply to the water softener which, in some cases, may be inconvenient and/or which may add to the cost of installation of the softener.

U.S. Pat. No. 5,681,454 discloses water treatment apparatus having several water treatment components all but one of which are coupled to respective pressure-controlled valves. The apparatus is intended for use where the demand for treated water may vary, e.g. because different numbers of consumers are using it at any one time, but where each component is most efficient over a particular range of throughput. Accordingly, the valves operate to bring different numbers of the components into operation depending on the demand level. Pressure operated valves are used so as to avoid the need for electronic metering.

Applicant's own prior patent GB2,362,114 discloses a water softener apparatus comprising two water softener tanks and valve means for causing said two tanks to be rendered inoperable to soften water at respective different intervals so that at least one tank is operable all the time, wherein said valve means comprises water-flow controlled valve means and the apparatus includes a water driven flow-meter for controlling said valve means. A regeneration meter measures a pre-set volume of softened water considered necessary to regenerate either of said two tanks.

OBJECTS OF THE INVENTION

An object of the invention is to mitigate or obviate to some degree one or more problems associated with known water softener apparatuses.

The above object is met by the combination of features of the main claims; the sub-claims disclose further advantageous embodiments of the invention.

Another object of the invention is to mitigate or obviate to some degree one or more problems associated with using a regeneration meter to measure a pre-set volume of softened water considered necessary to regenerate a water softener tank.

One skilled in the art will derive from the following description other objects of the invention. Therefore, the foregoing statements of object are not exhaustive and serve merely to illustrate some of the many objects of the present invention.

SUMMARY OF THE INVENTION

In a first main aspect, the invention provides a water softener apparatus comprising: two water softener components; valve means which are preferably water controlled; a water driven flow-meter for controlling said valve means to cause said two water softener components to be rendered inoperable to soften water at respective different intervals so that at least one water softener component is operable all the time; a regeneration system for alternately regenerating said two water softener components during said respective different inoperable intervals, said regeneration system including a water driven regeneration meter for controlling said valve means to terminate regeneration of said two water softener components during said respective different inoperable intervals; wherein said regeneration meter is positioned in the apparatus downstream of a point where brine for regeneration of the two water softener components is received into the apparatus and preferably positioned at a drain of the apparatus.

In a second main aspect, the invention provides a method of manufacturing a water softener apparatus according to the first main aspect, the method comprising: providing two water softener components; providing valve means; arranging a water driven flow-meter to control said valve means to cause said two water softener components to be rendered inoperable to soften water at respective different intervals so that at least one water softener component is operable all the time; arranging a regeneration system to alternately regenerate said two water softener components during said respective different inoperable intervals, said regeneration system including a water driven regeneration meter arranged to control said valve means to terminate regeneration of said two water softener components during said respective different inoperable intervals; and positioning said regeneration meter in the apparatus downstream of a point where brine for regeneration of the two water softener components is received into the apparatus.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Figure 1:
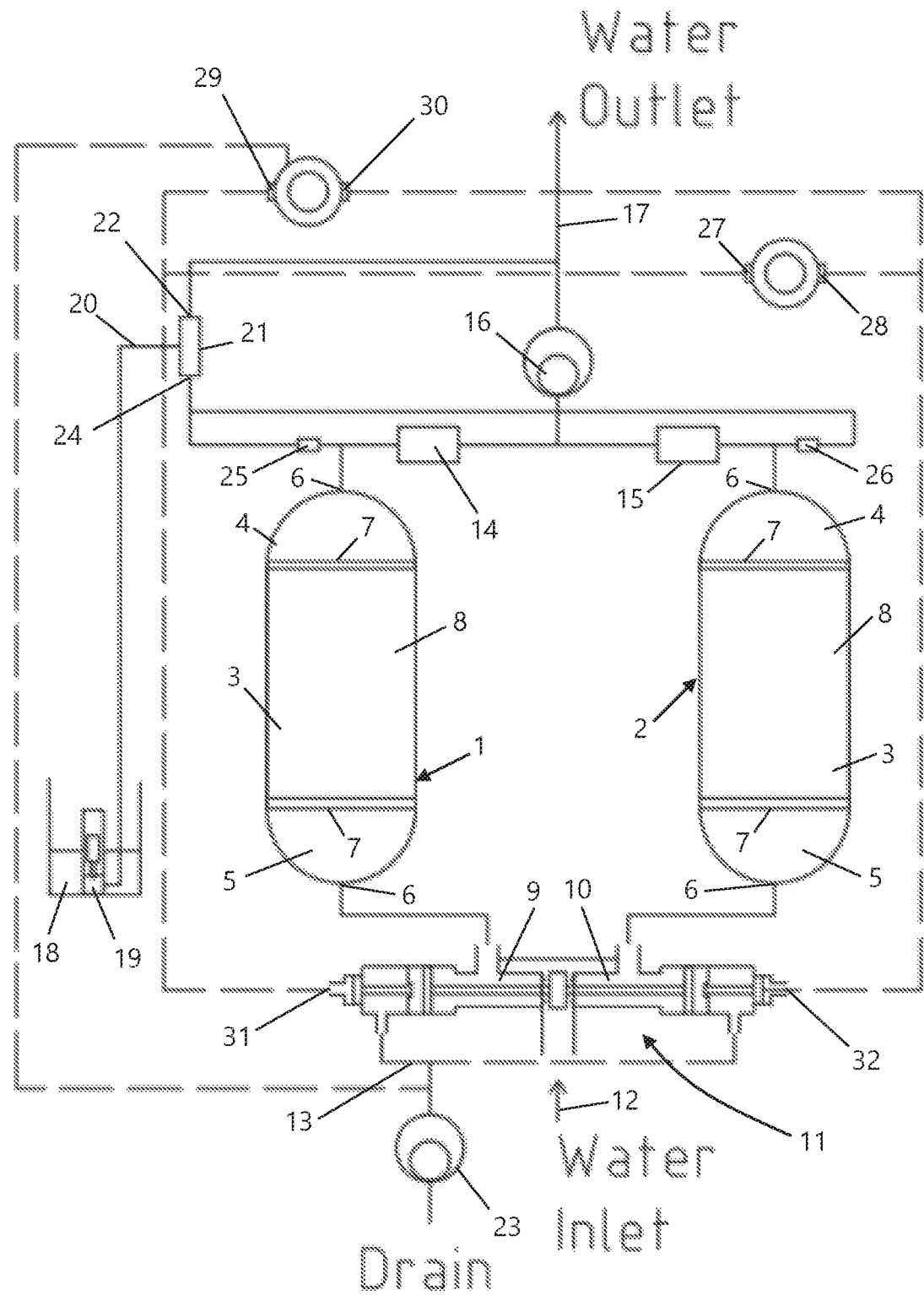
FIG. 1 is a simplified diagram showing the components of a water softener and the connections therebetween.

The water softener of FIG. 1 comprises two resin tanks 1 and 2. Each tank has a cylindrical central portion 3 and two dome-shaped ends 4 and 5 with, at the centre, a water entry/exit port 6. In one embodiment, the tank is formed in two halves each comprising a dome-shaped end 4 or 5 and half of the cylindrical portion 3. The two halves of the tank are then butt-welded together, i.e. around the centre of the tank. Before this, however, two stainless steel mesh screens 7 are welded into the interior of each half of the tank so that they will separate the dome shaped ends 4 and 5 from the cylindrical portion 3, and this cylindrical portion 3 is filled with the ion exchange resin 8. In use of the water softener, the tanks are positioned upright as shown with water flowing upwards from the port 6 in the lower end 5 of the tank, through the resin 8 and then out of the port 6 in the upper end 4 of the tank when the resin is supplying softened water while, for regeneration, salt water (brine) flows down via port 6 in the upper end 4, through the resin 8, and out of the tank through the port 6 in its lower end.

It will be appreciated that different embodiments of resin containing water softener tanks may be utilised in embodiments of the invention.

The ports 6 at the lower ends 5 of the tanks 1 and 2 are connected via respective pipes to respective ones of two chambers 9 and 10 in a shuttle valve 11 to be described later. The valve 11 also has a connection 12 from the supply of water to the softened, e.g. the water mains, and connections 13 to a drain via a regeneration meter 23, there preferably being a fine debris blocking screen (not shown) fitted at that side of the meter 23 which is nearest the connections 13. The regeneration meter 23 forms part of a regeneration system of the apparatus including also valve means to be described and a service meter 16 to be described.

The ports 6 at the upper ends 4 of the tanks 1 and 2 are connected via respective check valves 14 and 15 to a common input of the service meter 16. An output of this meter leads via pipe 17 to the softened water outlet of the softener apparatus. This pipe will be connected in use via a union (not shown) to the user's domestic stored water system (not shown).

The valves 14, 15, 25, 26, 27, 28, 29, 30 are preferably water controlled valves with the advantage that no electrical power supply is required for the apparatus. However, in some embodiments, electrically or electronically controlled valves may be utilised.

Figure 9:
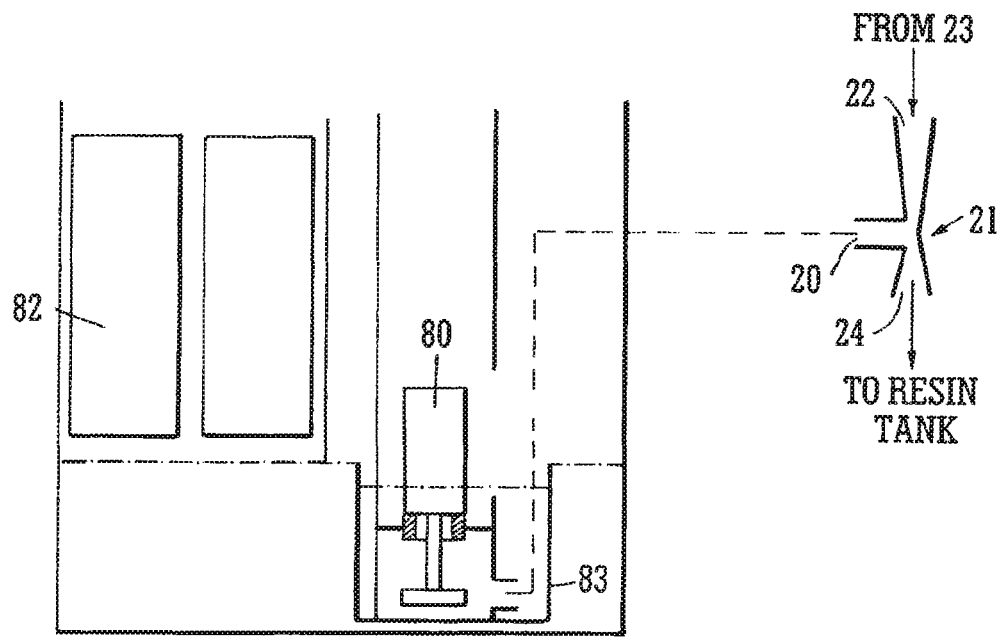

The softener also comprises a brine tank 18 and brine valve 19 connected to an injection input 20 of an injector 21 which also has an input port 22 connected to the softened water outlet pipe 17. An outlet port 24 of the injector 21 leads via respective further check valves 25 and 26 to the ports 6 at the upper ends of the tanks 1 and 2, i.e. so that the port 6 at the top of tank 1 is connected to both cheek valves 14 and 25 while port 6 at the top of tank 2 is connected to check valves 15 and 26. As shown in FIG. 9, the injector 21 comprises a duct between the input and output ports 22 and 24 which duct is shaped to provide a restriction and hence a pressure drop when water is flowing through it from pipe 17. This causes brine from the tank 20 to be sucked into the injector 21 and mixed with the softened water flowing from the outlet port 24.

The service meter 16 is arranged to operate two service valves 27 and 28 while the regeneration meter 23 is similarly coupled to two regeneration valves 29 and 30. The valves 27, 28, 29 and 30 are in turn operable to control the shuttle valve 11. The valve 11 has two control ports 31 and 32. The valve 11 is a servo-valve and its operation is governed by the pressure of water at its two control ports. One port is connected via a suitable conduit, e.g. a relatively narrow bore tube, to an output of the valve 27 and to an output of the valve 29. Meanwhile, the other control input of shuttle valve 11 is connected via a suitable conduit an output of the service valve 28 and an output of the regeneration valve 30.

The service meter 16 measures the flow of softened water supplied by the water softener. The meter operates the service valves 27 and 28 so that each time a predetermined quantity of softened water has been supplied, regeneration of one of the tanks is started. Similarly, during regeneration, the regeneration meter 23 operates via regeneration valves 29 and 30 to set a predetermined quantity of water to pass through the tank being regenerated. During regeneration, brine from tank 18 is mixed with this water for a time (controlled by the brine valve 19). The position of the regeneration meter 23 is important. Previously, it has been known to position the regeneration meter in the pipe leading from the water outlet pipe 17 to the input port 22 of the injector. However, whilst this has been found to be generally effective, it has been found that the regeneration meter 23 is measuring only softened water being fed to the injector port 22 rather than the amount of softened water with injected brine required to flow through the tank 1, 2 being regenerated. As such, in the present embodiments, the water regeneration meter is preferably positioned in the apparatus at a point downstream of where brine for regeneration of the two water softener components is received into the apparatus, i.e. downstream of the injector 21, such that the regeneration meter 23 measures the volume of softened water and brine being used to regenerate one of the tanks 1, 2. This provides a more accurate operation of the regeneration meter in terminating alternate regeneration of the tanks 1, 2. Unexpectedly, it has been found that positioning the regeneration meter 23 adjacent to the shuttle valve 11 and, more particularly, at the drain provides the advantage that the regeneration meter 23 acts also to ensure all water to the drain is recorded. This in turn ensures that any error state that occurs in any of the valves does not cause excess volume of water to be lost down the drain. In short, the regeneration meter 23 not only operates to terminate alternate regeneration of the tanks 1, 2, but also acts as a fail safe mechanism for the valve means of the apparatus.

Figure 4:
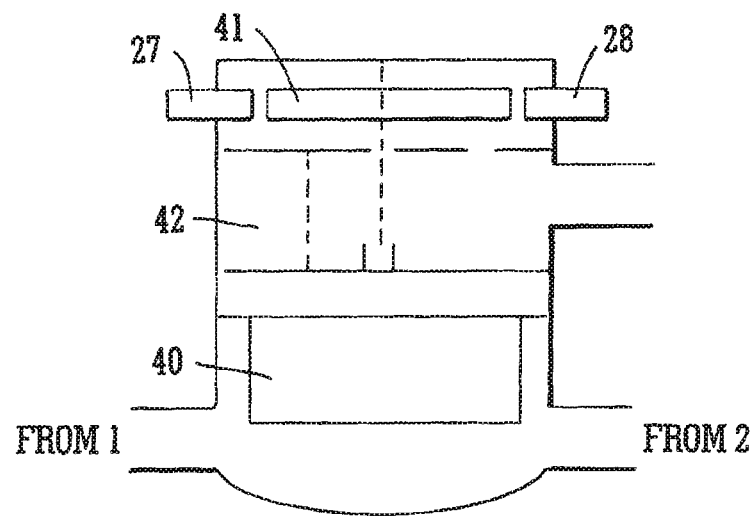
FIGS. 4 and 5 are two diagrams for explaining the construction and operation of a service meter used in the FIG. 1 softener.
Figure 5:
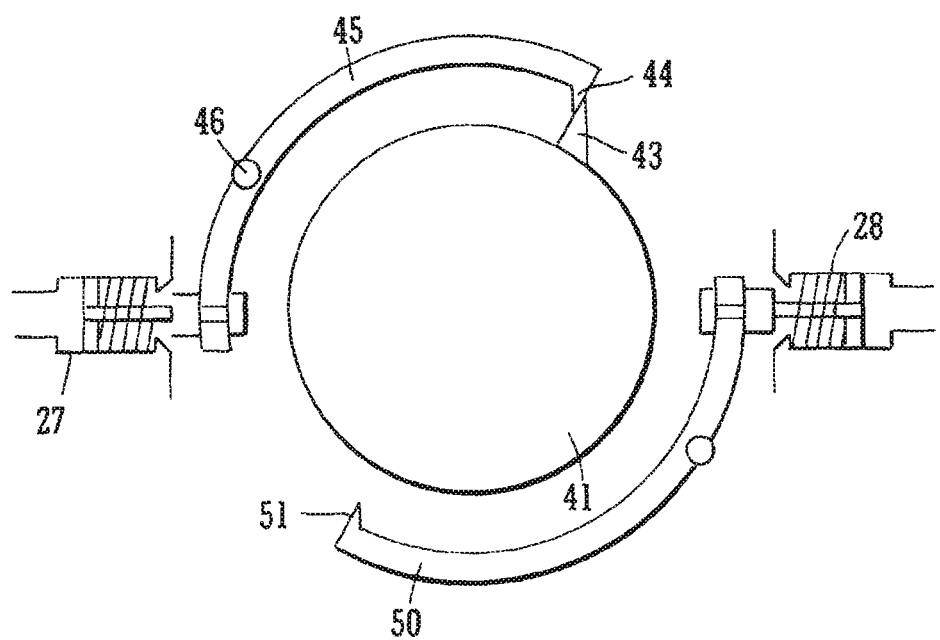

As shown in FIGS. 4 and 5, softened water from both tanks 1 or 2 enters the meter 16 and passes through the metering chamber 40. This metering chamber contains a piston type water meter which measures accurately the volume of water passing through to the outlet pipe 17. The meter chamber drives the service meter cam 41 via a series of gears 42. One rotation of the service meter cam is equivalent to the pre-set volume of water that may be softened by both resin tanks.

As the service meter cam 41 rotates anticlockwise the blade 43 on the service cam pushes a blade 44 on the service lever 45 so that the lever 45 moves about the pivot 46 which levers open the service valve 27 enabling a water pressure signal to flow from the meter to the shuttle valve port 29.

As softened water continues to flow through the meter the blade 24 wipes past the lever blade 43 and closes the service meter valve 'locking in' the water pressure to the shuttle valve port 31. The volume of water required to wipe the blades past each other is less than the pre-set volume of water required to regenerate a resin tank.

Service lever 45 operates service valve 27 and starts the regeneration of resin tank 1. Similarly, service lever 50 with blade 51 operates service valve 28 and applies a pressure signal to shuttle valve port 32 to start the regeneration of resin tank 2. The lever blades 44 and 45 are positioned at 180 degrees to each other, therefore, the regeneration of either tank is 50% of the pre-set volume of one rotation of the service meter cam. The pre-set volume may be altered by changing the ratio of the gear chain between the meter chamber and the service cam.

The regeneration meter 23 measures the pre-set volume of softened water and brine necessary to regenerate either resin tank 1 or 2. After the pre-set volume of regeneration water with brine has passed through the meter it stops the regeneration.

Figure 6:
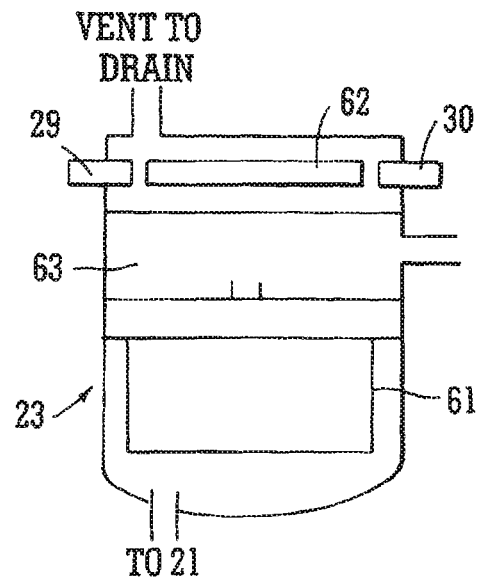
FIGS. 6 and 7 are two diagrams for explaining the construction and operation of a regeneration meter used in the FIG. 1 softener.
Figure 7:
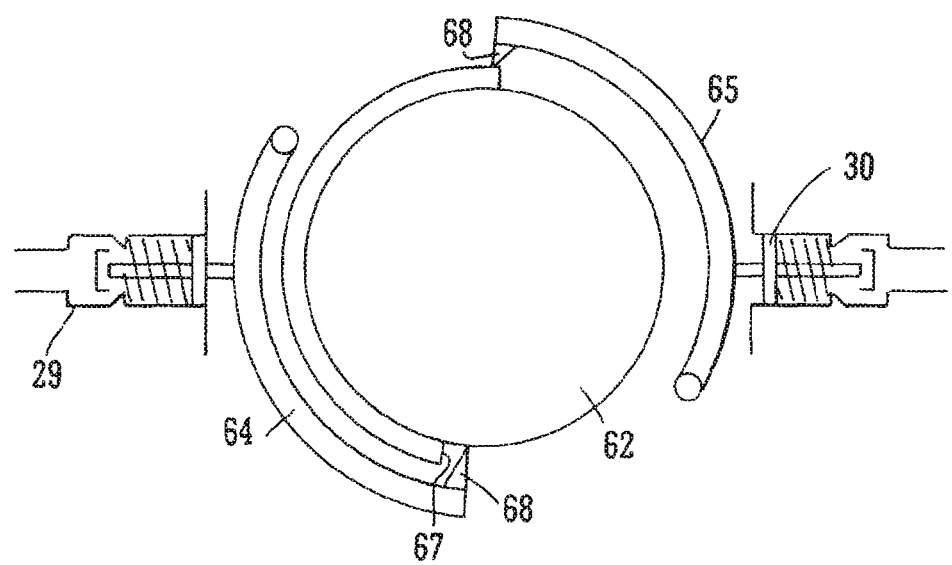

As shown in FIGS. 6 and 7, softened water enters the metering chamber 61 of the regeneration meter 23 and flows through the metering chamber 61. This chamber again contains a piston type water meter which accurately measures the volume of water passing through the meter chamber. The meter chamber drives the regeneration cam 62 via a series of gears 63. Half a rotation of the regeneration meter cam is equivalent to the pre-set volume of water with entrained brine necessary to regenerate one resin tank.

At the start of the regeneration of resin tank 1 the regeneration meter cam 62 is positioned so that regeneration lever 64 is 'free' and therefore regeneration valve 29 is closed. This 'locks in' the pressure signal from the service valve 27 which opens drain shuttle valve port 31. The regeneration meter cam has pushed open the regeneration valve 30 via lever 65, this prevents resin tank 2 from regenerating at the same time as resin tank 1 by venting any pressure signal to drain shuttle valve port 32.

As regeneration water with brine passes through the regeneration meter 23 the cam 62 rotates clockwise until, at the end of the regeneration, the lever blade 68 on lever 65 drops off the rear step of the cam 62. Lever 65 is now free to let the spring close valve 30. The cam 62 continues to rotate anticlockwise. The front step 67 of the cam 62 pushes the blade 68 on lever 64 which opens valve 29. Opening valve 29 vents to drain the water pressure holding open drain shuttle valve port 31 so that the drain shuttle A then closes.

Regeneration lever 64 operates regeneration valve 29 and stops the regeneration of resin tank 1. Regeneration lever 65 operates regeneration valve 30 and stops the regeneration of resin tank 2. The lever blades are positioned at 180 degrees to each other, therefore the volume of regeneration water with brine for each tank is 50% of the pre-set water volume necessary to rotate the regeneration cam once. The pre-set volume may be altered by changing the gear ratio between the meter chamber and the regeneration cam.

Figure 2:
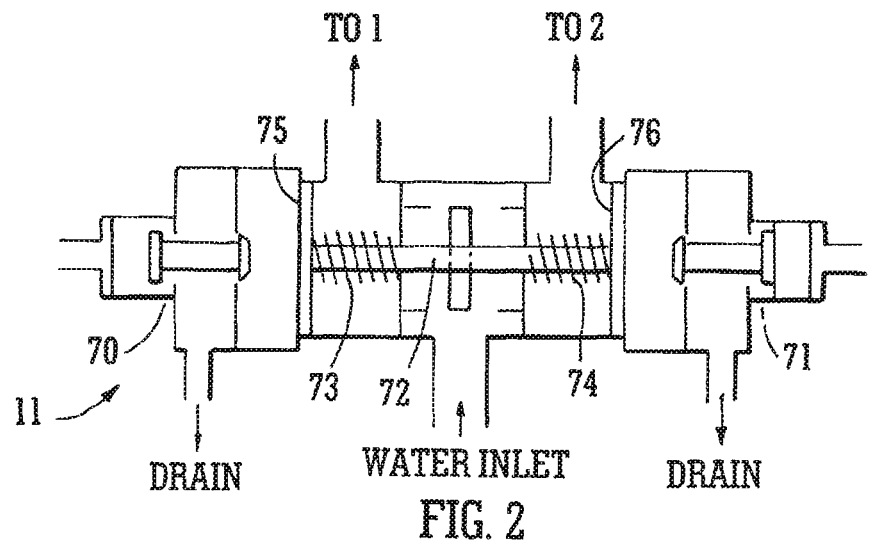
FIGS. 2 and 3 are two diagrams for explaining the construction and operation of a shuttle valve used in the FIG. 1 water softener.
Figure 3:
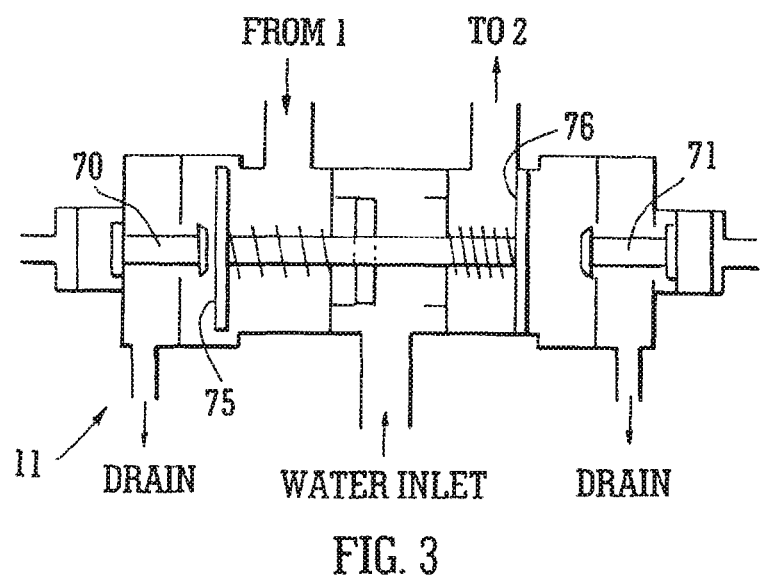

Referring to FIGS. 2 and 3, the shuttle valve 11 distributes inlet water equally between resin tanks 1 and 2 when both tanks are in service, and diverts hard water to either resin tank 1 or 2 during regeneration. It also enables regeneration water from either resin tank 1 or 2 to flow to drain where such water volume is preferably measured by the regeneration meter 23.

In the service position hard water flows through the valve to both resin tanks 1 and 2. Drain shuffles 70 and 71 are held closed. The shuttle valve 11 comprises a housing defining chambers connected to the respective resin tanks. A shuttle 72 is mounted in the housing, it comprises a spindle with two pistons 75 and 76 at its ends and a central valve member. The shuttle 72 is held in a central position by the springs 73 and 74 which are of equal strength and oppose each other.

The regeneration of resin tank 1 is started by a water pressure signal from the service valve 27 which opens drain shuttle 70. The path of water to flow to drain is now open, the flow of water to drain now pushing across piston 75 and closing the valve seal on its seat. Hard water can only now flow to resin tank 1 for softening. The regeneration water now flows from resin tank 1 past piston 75 through the open drain shuttle and then to drain.

When regeneration valve 1 opens the water pressure signal opening drain shuttle 70 is vented to draw in allowing water pressure to push drain shuttle 70 back to the closed position which equalises the water pressure in resin tanks 1 and 2 enabling the shuttle to return to a central service position; hard water again now flows to both resin tanks, that is the shuttle valve has returned to its service position.

The regeneration of resin tank 2 is the same operation but uses drain shuttle 71 and piston 76 etc.

Figure 8:
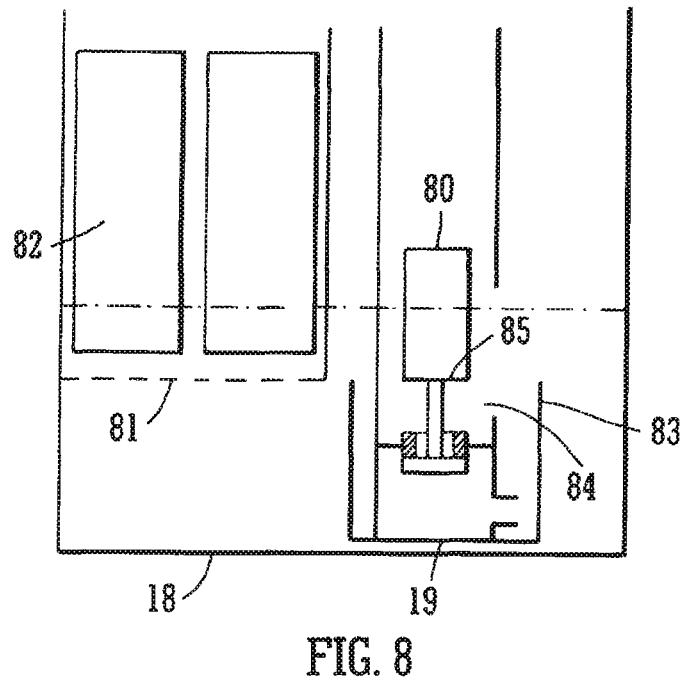
FIGS. 8 and 9 are two diagrams for explaining the construction and operation of a brine tank and valve used in the FIG. 1 water softener.

As shown in FIGS. 8 and 9, softened water fills the brine tank 18 via the brine valve 19 until shut off by the brine valve float 80 to a level above the platform 81. The salt 82 is gradually dissolved in the water producing brine.

During the regeneration of a resin tank softened water flows through the injector 21 from the inlet 22 to the outlet 24 producing a partial vacuum at the suction point in the injector 21 which draws brine from the brine tank as shown. The brine is mixed with the water flowing through the injector which then flows to the resin tank in regeneration and ultimately through the regeneration meter 23.

Brine continues to be sucked from the brine tank until the brine level stops filling when it reaches the height of the walls of a cup-shaped weir 85. The level continues to fall in the weir chamber 84 until it reaches a point which enables the upper seal 85 to check shut and no more brine is sucked from the brine tank. Water continues to flow through the injector to flush any brine to drain from the resin tank.

When the softener returns to the service position the brine tank again refills with water until shut off by the brine valve float.

The amount of brine being capable of being sucked from the brine tank may be adjusted by raising or lowering the brine valve relative to the weir. This raises or lowers the shut off point of the water refilling the brine tank, thus adjusting the volume of brine.

Placing the meter 23 adjacent to the shuttle valve 11 and, more particularly, at the drain is such that, in most failure events of excess water to drain, the water is captured and registered by the meter 23 thereby driving the regeneration cam 62 via the series of gears 63. Rotating the regeneration cam 62 via the series of gears 63 opens the regeneration lever 64 which in turn releases the lock pressures on regeneration valves 29, 30 freeing any unwanted back pressure on a diaphragm of the meter 23 from unusual sight conditions or machine malfunctions. Removing the back pressure ensures valves associated with drain are firmly shut and no water is flowing to drain.

Various modifications may be made to the described apparatus. For example, the weir 85 is optional. Alternative means may be provided for adjustment of the water shut-off point or this point could be fixed rather than adjustable.

REGENERATION OF TANK 1 After a predetermined volume of water has passed through the softener as recorded by the service meter 16, service valve 27 opens and a pressure water signal is delivered to drain shuttle 70, opening it. The open drain shuttle 70 opens a path for water to flow to the drain. Water in chamber 9 pushes the shuttle 72 across a shown in FIG. 3, stopping hard water flow to resin tank 1. All hard water flow is directed to resin tank 2 which softens all the water now passing through the softener. Soft water flows from pipe 17 to the injector 21 which sucks brine from the brine tank via the brine valve. The brine solution passes through the regeneration check valve 25 and into the top of resin tank 1. Service check valve 14 closes, stopping softened water from resin tank 2 from entering resin tank 1. The brine solution flows down through resin tank 1 and regenerates the cation ion exchange resin in the resin tank. The brine solution then passes through chamber 9 and then via the regeneration meter 23 to drain.

REGENERATION OF TANK 2 After a predetermined volume of water has passed through the softener as recorded by the service meter 16, service valve 28 opens and a pressure water signal is directed to drain shuttle 71, opening it. The open drain shuttle 71 opens a path for water to flow to the drain. Water in chamber 70 pushes the shuttle 72 across as shown in FIG. 1, stopping hard water flow to resin tank 1. All hard water flow is directed to resin tank 1 which softens all the water now passing through the softener. Soft water flows from pipe 17 to the injector 21 which sucks brine from the brine tank via the brine valve. The brine solution passes through the regeneration check valve 26 and into the top of 12 resin tank 2. Service check valve 15 closes, stopping softened water from resin tank 1 from entering resin tank 2. The brine solution flows down through resin tank 1 and regenerates the cation ion exchange resin in the resin tank. The brine solution then passes through chamber 10 and then via the regeneration meter 23 to drain.

In general, the invention provides a water softener apparatus comprising two water softener tanks one of which is always operating, valves controlling the flow of water and a flow-meter, wherein, after a set volume of water has passed through one tank, water is passed through the other tank. The apparatus uses ion-exchange tanks which may be regenerated by brine when not softening hard water. The flow-meter preferably comprises an actuator which moves in a cyclic movement in response to the flow of a set quantity of water and actuates two service valves which send pressured water signals to a drain shuttle valve. The drain shuttle valve then diverts hard water from one tank to another and initiates regeneration of the first tank. A regeneration meter terminates the alternate regeneration of the two tanks. The regeneration meter is positioned in the apparatus of a point where brine for regeneration of the two water softener components is received into the apparatus.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A water softener apparatus comprising:
   two water softener components;
   valve means;
   a water driven flow-meter for controlling said valve means to cause said two water softener components to be rendered inoperable to soften water at respective different intervals so that at least one water softener component is operable all the time;
   a regeneration system for alternately regenerating said two water softener components during said respective different inoperable intervals, said regeneration system including a water driven regeneration meter for controlling said valve means to terminate regeneration of said two water softener components during said respective different inoperable intervals;
   wherein said water driven regeneration meter is positioned in the apparatus downstream of an injection point where brine for regeneration of the two water softener components is injected into softened water flowing through the injection point and flowing through the water driven regeneration meter such that the brine mixed with the softened water flows to a respective one of said two water softener components during its inoperable interval for regeneration of said respective one of said two water softener components and such that the water driven regeneration meter measures a volume of regeneration water including the injected brine being used to regenerate the respective one of the two water softener components; and wherein, after brine injection into the softened water terminates, the softened water flowing through the injection point and the water driven regeneration meter continues to flow through the respective one of the two water softener components' during its inoperable interval to flush any residual brine from the water driven regeneration meter and the respective one of the two water softener components to exit a drain of the water softener apparatus.

2. The water softener apparatus according to claim 1, wherein the valve means are water-flow controlled valve means.

3. The water softener apparatus according to claim 1, wherein said water driven flow-meter is arranged to initiate alternate regeneration of said two water softener components during said respective different inoperable intervals.

4. The water softener apparatus according to claim 1, wherein the water driven regeneration meter is positioned in a last stage of the regeneration system.

5. The water softener apparatus according to claim 1, wherein the water driven regeneration meter is positioned at a shuttle valve of the apparatus.

6. The water softener apparatus according to claim 1, wherein the water driven regeneration meter is positioned at the drain of the apparatus.

7. The water softener apparatus according to claim 1, wherein said two water softener components comprise respective tanks containing ion exchange resin, the water driven flow-meter being operable to control said valve means to initiate alternate regeneration of the ion exchange resin in the respective tanks by a flow of brine through the ion exchange resin being regenerated.

8. The water softener apparatus according to claim 7, wherein the water driven flow-meter comprises a movable actuator member arranged for cyclic movement in response to a flow of a predetermined quantity of water supplied by one of the two water softener components and two valves for being actuated by said movable actuator member at respective different positions in its cycle of movement, said two valves being operable when so actuated for initiating said regeneration.

9. The water softener apparatus according to claim 7, wherein the water driven regeneration meter comprises a movable actuator member arranged for cyclic movement in response to a flow of a predetermined quantity of water supplied by one of the two water softener components and two valves for being actuated by said movable actuator member at respective different positions in its cycle of movement, said two valves being operable when so actuated for terminating said regeneration.

* * * * *